US012712786B2

(12) United States Patent
Liu et al.

(10) Patent No.: US 12,712,786 B2
(45) Date of Patent: Aug. 18, 2026

(54) DISTRIBUTED MOBILE NETWORK TRAFFIC DATA DECOMPOSITION AND FORECASTING METHOD AND APPARATUS

(71) Applicant: NET AI TECH LTD., Edinburgh (GB)

(72) Inventors: Haoyu Liu, Edinburgh (GB); Marco Fiore, Edinburgh (GB); Paul Patras, Edinburgh (GB)

(73) Assignee: NET AI TECH LTD., Edinburgh (GB)

( * ) Notice: Subject to any disclaimer, the term of this patent is extended or adjusted under 35 U.S.C. 154(b) by 55 days.

(21) Appl. No.: 18/859,073

(22) PCT Filed: Apr. 24, 2023

(86) PCT No.: PCT/GB2023/051077

§ 371 (c)(1),
(2) Date: Oct. 22, 2024

(87) PCT Pub. No.: WO2023/203356

PCT Pub. Date: Oct. 26, 2023

(65) Prior Publication Data

US 2025/0286789 A1 Sep. 11, 2025

(30) Foreign Application Priority Data

Apr. 22, 2022 (GB) ...................................... 2205881

(51) Int. Cl.

| | |
|---|---|
| ***H04L 41/147*** | (2022.01) |
| ***H04L 41/0826*** | (2022.01) |
| ***H04L 41/16*** | (2022.01) |

(52) U.S. Cl.

CPC ........ *H04L 41/147* (2013.01); *H04L 41/0826* (2013.01); *H04L 41/16* (2013.01)

(58) Field of Classification Search

CPC .... H04L 41/147; H04L 41/0826; H04L 41/16
See application file for complete search history.

(56) References Cited

U.S. PATENT DOCUMENTS

| | | | |
|---|---|---|---|
| 11,381,468 B1 * | 7/2022 | Thompson | H04L 67/101 |
| 2021/0194988 A1 * | 6/2021 | Chaysinh | H04L 41/5025 |
| 2021/0288991 A1 * | 9/2021 | Shakarian | H04L 41/16 |

OTHER PUBLICATIONS

Bega Dario , et al., "$\alpha$-OMC: Cost-Aware Deep Learning for Mobile Network Resource Orchestration," IEEE Infocom 2019—IEEEConf on Computer Communications Workshops, pp. 423-428 (Apr. 29, 2019) XP033619458.

(Continued)

*Primary Examiner* — Minh Chau Nguyen

(74) *Attorney, Agent, or Firm* — Saul Ewing LLP

(57) ABSTRACT

A distributed mobile network traffic data decomposition and forecasting computer-implemented method, comprising:

using a geo-location preserving mobile network representation. Locations of mobile network elements are received and converted into a graph representation. Relative distances between adjacent network elements are preserved using respective weights on graph edges; input data is received comprising aggregate network traffic data from network elements corresponding to the network elements locations. The aggregate data includes traffic data corresponding to a plurality of services operating over the network. A graph-based neural network based on the geo-location is used, preserving mobile network representation and configured to capture spatial and temporal correlations in the input data, including at least a spatio-temporal concentration block (STCB) and a parallel prediction block (PPB); loss functions train the graph-based neural network using the input data, to provide network per-service traffic forecasting, the loss functions including an operator cost function configured to capture operator costs.

26 Claims, 6 Drawing Sheets

(56) References Cited

OTHER PUBLICATIONS

Bega Dario , et al., "DeepCog: Cognitive Network Management in Sliced 5G Networks with Deep Learning," IEEE Infocom 2019—IEEE Conf on Computer Communications, pp. 280-288 (Apr. 29, 2019) XP033561229.
Guto Leoni Santos , et al., "Predicting Short-term Mobile Internet Traffic from Internet Activity using Recurrent Neural Networks," arxiv.org, Cornell University Library (Oct. 12, 2020) XP081784320.
Kaloxylos Alexandros , et al., "AI and ML—Enablers for Beyond 5G Networks," (Dec. 31, 2020); Retrieved from the Internet: URL:https://5g-ppp.eu/wp-content/uploads/2021/05/AI-MLforNetworks-v1-0.pdf [retrieved on Mar. 29, 2022) XP055906766.
Wang Jing , et al., "Spatiotemporal modeling and prediction in cellular networks: A big data enabled deep learning approach," IEEE Infocom 2017—IEEE Conference on Computer Communications, pp. 1-9 (May 31, 2017) XP33160463.
Zhang Chaoyun Chaoyun Zhang@Ed , et al., "Microscope mobile service traffic decomposition for network slicing as a service," Proc. of the 33rd Annual ACM Symposium on User Interface Software and Technology, ACMPUB27, pp. 1-14 (Sep. 21, 2020) XP058727006.
International Search Report, dated Sep. 25, 2023, issued in International Application No. PCT/GB2023/051077.

* cited by examiner

DISTRIBUTED MOBILE NETWORK TRAFFIC DATA DECOMPOSITION AND FORECASTING METHOD AND APPARATUS

CROSS-REFERENCE TO RELATED APPLICATIONS

This application claims the priority of International Application No. PCT/GB2023/051077, filed Apr. 24, 2023, which claims priority to GB Application No. 2205881.2, filed Apr. 22, 2022, the entire contents of which being fully incorporated herein by reference.

BACKGROUND OF THE INVENTION

1. Field of the Invention

The field of the invention relates to computer-implemented methods for distributed mobile network traffic data decomposition and forecasting, and to related apparatus and computer program products.

2. Technical Background

Although existing studies reveal the possibility of leveraging traditional deep learning building blocks (convolutional neural network (CNN) and long short-term memory (LSTM)) to handle mobile traffic decomposition and mobile traffic forecasting, they tend to oversimplify the spatial complexity inherent to mobile data and fail to incorporate the practical demands of mobile operators into neural architecture designs. For instance, in order to use any convolution neural networks to capture the spatio-temporal dependencies in mobile traffic, the Microscope project [1] maps the coordinates of antennas onto a regular grid, e.g. via the Hungarian algorithm, following which each mobile traffic source/sink has a fixed distance to the adjacent ones. Such pre-processing is invisible to the neural networks that carry out mobile traffic analysis tasks and thus the spatial distortion introduced during the preprocessing step becomes irreversible, regardless of what deep learning (DL) model is subsequently employed. Similar simplifications are also made in another work [2].

Secondly, existing methods for mobile traffic forecasting only give limited insights into the evolution of per-service consumption in the future, while mobile operators have to consider additional factors (including costs of under-provisioning and of over-provisioning, reliability of the forecasting results, etc.) to achieve anticipatory resource allocation.

3. Discussion of Related Art

WO2021186158A1 discloses a distributed network traffic data decomposition method which makes use of a neural network to provide a future per-service traffic consumption prediction without deep-packet inspection or another resource intensive analysis method. There is disclosed a distributed network traffic data decomposition method comprising the steps of:

- receiving input data comprising aggregate network traffic data from a plurality of distributed source locations, wherein the aggregate data includes traffic data corresponding to a plurality of services operating over the network;
- converting the input data into a format suitable for further analysis by rearranging and mapping the locations of the plurality of source locations such that the source locations are arranged in a regular grid pattern and separating the aggregate network traffic data into a time-dependent sequence of snapshots;
- analysing the converted data with a neural network, comprising a plurality of neural layers, to extract, in a final neural layer of the plurality of neural layers, a plurality of outputs from the converted data, wherein each output corresponds to decomposed traffic volume of one service of the plurality of services operating over the network; and employing 2D convolutions to extract a plurality of outputs from the determined spatiotemporal correlations; and predicting, based on the plurality of outputs, a future per-service traffic consumption. WO2021186158A1 is incorporated by reference.

EP3562205(A1) and EP3562205(B1) disclose, in a mobile communication environment, the data traffic is mapped to a number of bearers. In a downlink direction, this is accomplished by filtering data packets on the basis of an identifier which is included into the data packets in response to packet inspection. In the uplink direction, a mirroring function is applied which detects incoming data packets, which are received on one of a plurality of bearers and have a first identifier, and outgoing data packets having a second identifier which is complementary to the first identifier. The outgoing data packets having the complementary second identifier are routed to the same bearer from which the incoming data packets are received.

SUMMARY OF THE INVENTION

According to a first aspect of the invention, there is provided a distributed mobile network traffic data decomposition and forecasting computer-implemented method including the steps of:

(i) using a geo-location preserving mobile network representation in which locations of mobile network elements are received and converted into a graph representation, in which relative distances between adjacent network elements are preserved using respective weights on graph edges;

(ii) receiving input data comprising aggregate network traffic data from network elements corresponding to the network elements locations, wherein the aggregate data includes traffic data corresponding to a plurality of services operating over the network;

(iii) using a graph-based neural network based on the geo-location preserving mobile network representation, the graph-based neural network configured to capture spatial and temporal correlations in the input data, the graph-based neural network including at least a spatio-temporal concentration block (STCB) and a parallel prediction block (PPB);

(iv) using loss functions to train the graph-based neural network using the input data, to provide network per-service traffic forecasting, the loss functions including an operator cost function configured to capture operator costs, e.g. under-provisioning costs and/or over-provisioning costs.

An advantage is the avoidance of introducing spatial distortions in mobile traffic data that can harm inference accuracy. An advantage is that energy usage efficiency of the network can be improved. An advantage is that the separation of the two blocks ensures that the model has the flexibility to take different shapes of inputs and return different outputs without the need to modify the network architecture. An advantage is a reduced number of trainable parameters compared with best-in-class neural model for traffic decomposition, which reduces energy usage.

The method may be one including the step of storing weights of the trained graph-based neural network.

The method may be one wherein the graph representation is undirected.

The method may be one wherein the graph representation includes undirected weights.

The method may be one wherein the graph representation avoids spatial distortion.

The method may be one wherein the mobile network elements include one or more of: mobile base stations, Multi-access Edge Computing (MEC) facilities, Cloud Radio Access Network (CRAN) facilities, core network data centers.

The method may be one wherein the geo-location preserving mobile network representation is a representation block.

The method may be one wherein the geo-location preserving mobile network representation converts the locations into a graph representation based on respective coverage areas. An advantage is the avoidance of introducing spatial distortions in mobile traffic data that can harm inference accuracy.

The method may be one wherein the respective coverage areas are Voronoi cells.

The method may be one wherein in step (i), each node in the graph represents a traffic aggregation point, and the connectivity of nodes depends on the adjacency of their coverage areas. An advantage is the avoidance of introducing spatial distortions in mobile traffic data that can harm inference accuracy.

The method may be one wherein a Voronoi diagram is constructed using the mobile network elements, and is adopted to determine the coverage area of each mobile network element, and a graph edge is generated between two mobile network elements if they share adjacent coverage areas.

The method may be one wherein graph edges are pruned if the distance between respective network elements is greater than a threshold criterion. An advantage is to eliminate weak spatial correlations.

The method may be one wherein the threshold criterion is a predefined threshold criterion.

The method may be one including separating the aggregate network traffic data into a time-dependent sequence of snapshots.

The method may be one wherein the STCB concentrates multi-timestep inputs into a single-step hidden representation.

The method may be one wherein the STCB is a universal block for both traffic decomposition and traffic forecasting.

The method may be one wherein the method includes the step of using the STCB to encode historical inputs for the forecasting task, and using multiple (e.g. several) output blocks to approximate multi-step future traffic consumption in parallel.

The method may be one wherein an output block of a decomposition model receives as input an encoded representation from the spatio-temporal convolution blocks, and passes it through two 1D convolution layers to align the channel size with the number of services to decompose.

The method may be one wherein a STCB block includes a TGC layer, followed by a GSC layer, followed by a TGC layer. An advantage is stacking multiple spatio-temporal convolution blocks gives the model wider receptive fields on both space and timing dimensions.

The method may be one wherein a STCB block stacks TGC layers and GSC layers alternately. An advantage is stacking multiple spatio-temporal convolution blocks gives the model wider receptive fields on both space and timing dimensions.

The method may be one wherein in a STCB, each pair of TGC and GSC layers reduces the temporal dimension of the input data and gathers spatial information from neighboring nodes. An advantage is that as the neural network becomes deeper, higher-level feature abstraction is acquired, and the STCB eventually concentrates multi-timestep inputs into a single-step hidden representation.

The method may be one wherein a TGC layer includes two 1D convolution kernels that perform convolution operations on the time dimension of the input data, which are then passed through a non-linear gating unit.

The method may be one wherein a GSC layer approximates a spectral graph convolution via a Chebyshev polynomial.

The method may be one including acquiring a hidden representation that condenses the temporal dynamics into a single step.

The method may be one wherein the PPB transforms the hidden representation into multi-step predictions with multiple independent 1D-CNN layers, each of which generates only one-step predictions.

The method may be one wherein the number of parallel 1D-CNNs in PPB is fixed before training. An advantage is that the PPB has a lower number of parameters, which facilitates training, which improves energy efficiency.

The method may be one wherein the CNN layers have a kernel size of one, and a channel size is aligned with the number of services.

The method may be one wherein the graph-based neural network utilizes localized graph spectral convolution along with temporal gated convolution to learn complex spatio-temporal dependencies jointly.

The method may be one wherein the graph-based neural network comprises a plurality of neural layers, configured to extract, in a final neural layer of the plurality of neural layers, a plurality of outputs from the input data, wherein each output corresponds to decomposed traffic volume of one service of the plurality of services operating over the network.

The method may be one wherein the method includes using historical time series of aggregate mobile traffic consumption, e.g. as measured over multiple (e.g. several) time intervals (and possibly at different locations), and predicting per-service mobile traffic consumption at the current time, as well as the per-service mobile traffic consumption over a future time horizon.

The method may be one wherein the method includes receiving meta-data representing time series of aggregate mobile traffic volume and outputting the current volume of traffic consumed by individual mobile services, which comprise the mobile traffic aggregate.

The method may be one wherein the graph-based neural network includes Geo-sequential Graph Neural Networks (GSGNN). An advantage is a reduced number of trainable parameters compared with best-in-class neural model for traffic decomposition, which reduces energy usage.

The method may be one wherein the GSGNN include at least the Spatio-temporal Concentration Block (STCB) and the Parallel Prediction Block (PPB). An advantage is that the separation of the two blocks ensures that the model has the flexibility to take different shapes of inputs and return different outputs without the need to modify the network architecture.

The method may be one wherein the GSGNN includes two or more stacked STCB blocks. An advantage is that stacking multiple spatio-temporal convolution blocks gives the model wider receptive fields on both space and timing dimensions.

The method may be one wherein the GSGNN includes at least two layers: a temporal gated convolution (TGC) layer and a graph spatial convolution (GSC) layer. An advantage is giving the model receptive fields on both space and timing dimensions.

The method may be one wherein the GSGNN uses GPUs.

The method may be one wherein the GSGNN is configured to learn spatial and temporal correlations in mobile network traffic. An advantage is learning spatial and temporal correlations hidden in complex mobile network traffic.

The method may be one wherein a majority of the operations performed by GSGNN during training only involve addition, convolution and matrix multiplication. An advantage is allowing the model to be trained in mini-batches. An advantage is allowing the model to be trained with maximum GPU usage efficiency.

The method may be one wherein the GSGNN outputs the fractions of mobile traffic consumed by each service, relative to the corresponding aggregate.

The method may be one wherein for mobile traffic forecasting, the GSGNN is utilized with Monte Carlo Dropout (MC Dropout) to approximate the future traffic-consumption as well as the uncertainty of the predictions. An advantage is estimating the confidence of the predictions made.

The method may be one wherein the method adds dropout layers before every weight layer. An advantage is estimating the confidence of the predictions made.

The method may be one wherein the dropout layers randomly zero out trainable weights during both training and testing, resulting in different sets of weights applied in different forward passes. An advantage is estimating the confidence of the predictions made.

The method may be one wherein the GSGNN is implemented using Tensorflow 2.

The method may be one wherein the GSGNN is trained and optimized on an Amazon Web Services (AWS) p2 instance.

The method may be one wherein the GSGNN cannot produce predictions of arbitrary length. An advantage is facilitating training, which improves energy efficiency.

The method may be one wherein the operator cost function is biased to (e.g. always) overprovision. An advantage is reduced probability of failure of the network. An advantage is reduced probability of violation of Service Level Agreements (SLAs).

The method may be one wherein the loss functions include a KL-divergence function.

The method may be one wherein the loss functions include a cross-entropy function.

The method may be one including training decomposition neural networks with the KL-divergence function, or with the cross-entropy function.

The method may be one wherein neural network training is performed with aggregate traffic measurements and fine grained per-service traffic observations that involve deep packet inspection and classification.

The method may be one including the step of receiving a sequence of past aggregate mobile traffic snapshots as well as the current snapshot across the mobile network elements, and then outputting the fraction of traffic that belongs to each of the different services at each location at a current time step.

The method may be one wherein during inference, the mean of the predictions over forward passes is reported as the forecasting value or prediction.

The method may be one wherein the method also captures the uncertainty of the prediction by generating a band that covers a percentage of the samples and the band is a confidence interval of the same percentage.

The method may be one wherein a temporal gated convolution operation is used to capture temporal dynamics on the time axis of graph data.

The method may be one wherein the method includes using a one dimensional (1D)-CNN with a gating mechanism, when processing the temporal dimension of the graph data. An advantage is similar learning effect to RNN-based models without sacrificing model efficiency.

The method may be one wherein a TGC contains two separate 1D-CNN modules. An advantage is similar learning effect to RNN-based models without sacrificing model efficiency.

The method may be one wherein a decomposed time series of per-service consumption is fed to a forecasting model to approximate the per-service mobile traffic usage in the future.

The method may be one including the step of using predictions of per-service consumption to allocate resources to network slices. An advantage is more efficient use of network resources. An advantage is more energy efficient use of network resources.

The method may be one including the step of using the trained graph-based neural network to automatically allocate computational and capacity resources in the distributed mobile network. An advantage is more efficient use of network resources. An advantage is more energy efficient use of network resources.

The method may be one including anticipating the volume of traffic flowing through the network to provision an appropriate amount of resources, e.g. number of virtual machines/containers, central processing units (CPUs), memory capacity. An advantage is more efficient use of network resources. An advantage is more energy efficient use of network resources.

The method may be one including the step of using the trained graph-based neural network to improve energy efficiency of infrastructure of the distributed mobile network. An advantage is more efficient use of network resources. An advantage is more energy efficient use of network resources.

The method may be one wherein forecast traffic are inputs to a downstream logic that adjusts the capacity in the Radio Access Network (RAN) and enables infrastructure owners to optimise energy savings. An advantage is more efficient use of network resources. An advantage is more energy efficient use of network resources.

The method may be one wherein energy is saved by using optimal periodic (e.g., hourly or daily) RAN configurations that can be enacted at the corresponding time. An advantage is more efficient use of network resources. An advantage is more energy efficient use of network resources.

The method may be one wherein energy is saved by using live network performance optimisations. An advantage is more efficient use of network resources. An advantage is more energy efficient use of network resources.

According to a second aspect of the invention, there is provided an apparatus including at least one processor, wherein the at least one processor is configured to execute the method of any aspect of the first aspect of the invention.

An advantage is the avoidance of introducing spatial distortions in mobile traffic data that can harm inference accuracy. An advantage is that energy usage efficiency of the network can be improved. An advantage is that the separation of the two blocks ensures that the model has the flexibility to take different shapes of inputs and return different outputs without the need to modify the network architecture. An advantage is a reduced number of trainable parameters compared with best-in-class neural model for traffic decomposition, which reduces energy usage.

According to a third aspect of the invention, there is provided a trained apparatus including at least one processor trained using a method of any aspect of the first aspect of the invention, wherein the at least one processor is configured to perform the distributed mobile network traffic data decomposition and forecasting method.

According to a fourth aspect of the invention, there is provided a computer program product executable on a processor to perform a distributed mobile network traffic data decomposition and forecasting method, the computer program product executable on the processor to:

(i) use a geo-location preserving mobile network representation in which locations of mobile network elements are received and converted into a graph representation, in which relative distances between adjacent network elements are preserved using respective weights on graph edges;

(ii) receive input data comprising aggregate network traffic data from network elements corresponding to the network elements locations, wherein the aggregate data includes traffic data corresponding to a plurality of services operating over the network;

(iii) use a graph-based neural network based on the geo-location preserving mobile network representation, the graph-based neural network configured to capture spatial and temporal correlations in the input data, the graph-based neural network including at least a spatio-temporal concentration block (STCB) and a parallel prediction block (PPB);

(iv) use loss functions to train the graph-based neural network using the input data, to provide network per-service traffic forecasting, the loss functions including an operator cost function configured to capture operator costs, e.g. under-provisioning costs and/or over-provisioning costs.

An advantage is the avoidance of introducing spatial distortions in mobile traffic data that can harm inference accuracy. An advantage is that energy usage efficiency of the network can be improved. An advantage is that the separation of the two blocks ensures that the model has the flexibility to take different shapes of inputs and return different outputs without the need to modify the network architecture. An advantage is a reduced number of trainable parameters compared with best-in-class neural model for traffic decomposition, which reduces energy usage.

The computer program product may be executable on the processor to perform a method of any aspect of the first aspect of the invention.

According to a fifth aspect of the invention, there is provided a method including the step of using a graph-based neural network based on a geo-location preserving mobile network representation, the graph-based neural network configured to capture spatial and temporal correlations in input network traffic data. An advantage is that energy usage efficiency of the network can be improved.

The method may be one wherein the graph-based neural network includes at least a spatio-temporal concentration block (STCB) and a parallel prediction block (PPB). An advantage is that the separation of the two blocks ensures that the model has the flexibility to take different shapes of inputs and return different outputs without the need to modify the network architecture.

The method may be one including the step of using loss functions to train the graph-based neural network using input network traffic data, to provide network per-service traffic forecasting, the loss functions including an operator cost function configured to capture operator costs, e.g. under-provisioning costs and/or over-provisioning costs. The method may be one including a method of any aspect of the first aspect of the invention.

According to a sixth aspect of the invention, there is provided an apparatus including at least one processor, wherein the at least one processor is configured to execute the method of any aspect of the fifth aspect of the invention.

According to a seventh aspect of the invention, there is provided a trained apparatus including at least one processor trained using a method of any aspect of the fifth aspect of the invention, wherein the at least one processor is configured to perform the distributed mobile network traffic data decomposition and forecasting method.

According to an eighth aspect of the invention, there is provided a computer program product executable on a processor to perform a method of any aspect of the fifth aspect of the invention.

Aspects of the invention may be combined.

BRIEF DESCRIPTION OF THE FIGURES

Aspects of the invention will now be described, by way of example(s), with reference to the following Figures, in which.

DETAILED DESCRIPTION

1 Introduction

Figure 1A:
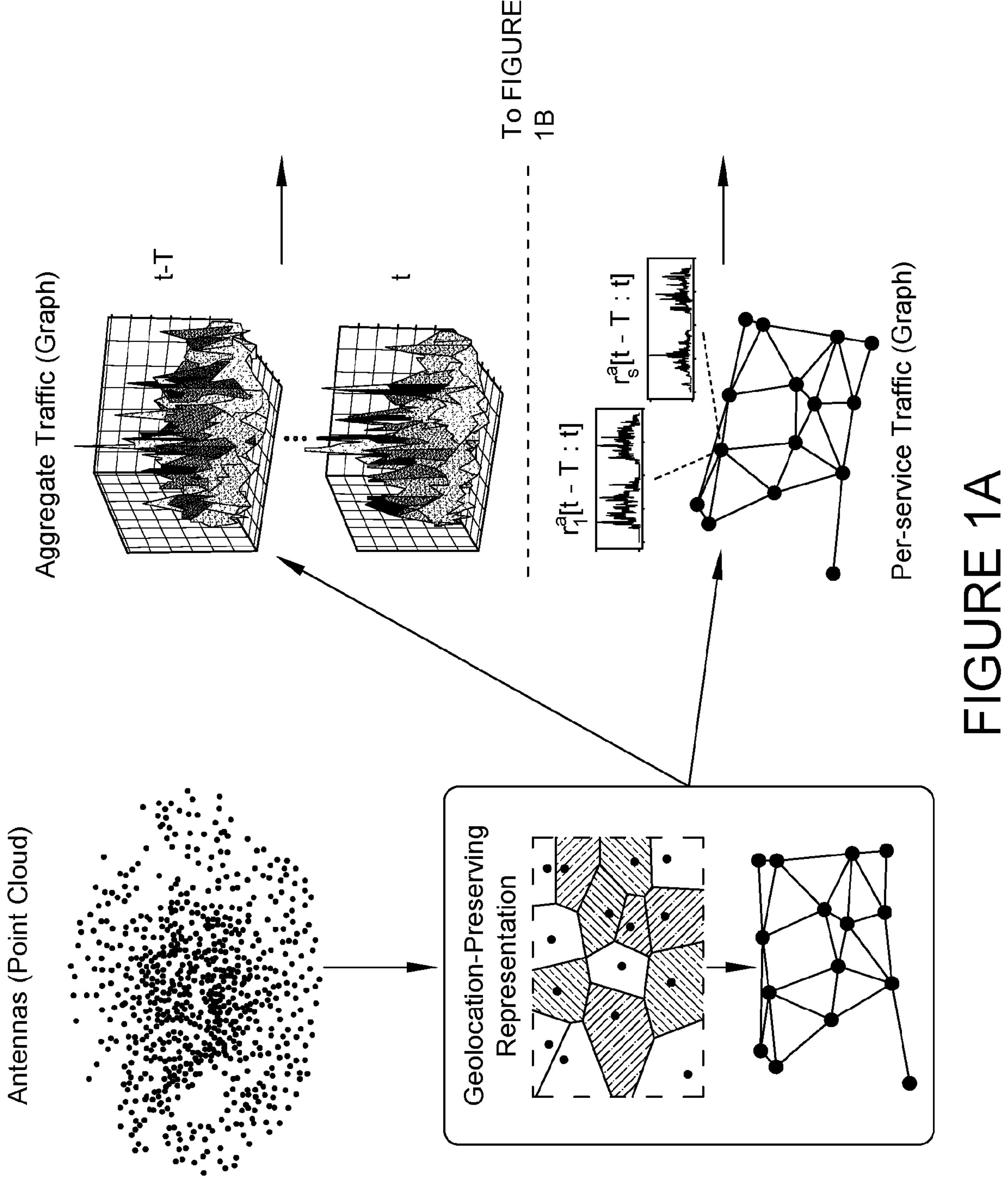
FIGS. 1A, 1B and 1C show an example of an Architecture of Mobile Traffic Decomposition and Mobile Traffic Forecasting.

In an example, we provide a Lightweight Graph Neural Framework for Uncertainty- and Cost-aware Mobile Traffic Decomposition and Mobile Traffic Forecasting.

In an example, we provide a novel graph-based uncertainty-aware framework to specifically handle spatio-temporal analytics tasks in the mobile networking domain, including mobile traffic decomposition and mobile traffic forecasting.

To address limitations of the prior art, we have designed NetSibulla, a general machine learning (ML) framework for deep mobile network traffic analysis and forecasting. We summarize some of our key contributions as follows:

1. We treat the deployment of antennas/traffic aggregation points as an undirected weighted graph, to avoid introducing spatial distortions in mobile traffic data that can harm inference accuracy, such as is caused by pre-processing employed in previous work;

2. We utilize localized graph spectral convolution along with temporal gated convolution to learn complex spatio-temporal dependencies jointly;
3. We adopt Monte Carlo (MC) dropout in our framework to capture the uncertainty that may surround the inference process, thereby providing mobile network operators with supplementary information about the confidence of our neural networks' output in regard to the predictions made;
4. For mobile traffic forecasting, we train the neural networks with an α-OMC (Operator Monetary Cost) function, which can accurately capture the actual monetary cost to operators under different circumstances (e.g. under-provisioning, or over-provisioning).

In an example, the designed method takes historical time series of aggregate mobile traffic consumption, e.g. as measured over several time intervals (and possibly at different locations), and predicts per-service mobile traffic consumption at the current time, as well as the per-service mobile traffic consumption over a future time horizon. In an example, the method is fed with meta-data representing time series of aggregate mobile traffic volume and outputs the current volume of traffic consumed by individual mobile services; which comprise the mobile traffic aggregate. This is referred to as Mobile Traffic Decomposition (MTD). The decomposed time series of per-service consumption is then fed to the forecasting model to approximate the per-service mobile traffic usage in the future, which is referred to as Mobile Traffic Forecasting (MTF). The combined MTD/MTF process can be applied to aggregate mobile traffic volume observed at any mobile network infrastructure entity, including base stations, Multi-access Edge Computing (MEC) or Cloud Radio Access Network (CRAN) facilities, and core network data centers. One use case is Network Slice as a Service (NSaaS), where information about per-service consumption drives allocation of resources to network slices. Network slicing is a type of functionality that enables multiple independent networks to exist on the same physical network, using different "slices" of the same spectrum band. This allows organizations to accommodate different application requirements e.g. for security, reliability, and performance, on the same network.

Multi-access edge computing (MEC), formerly mobile edge computing, is a European Telecommunications Standards Institute (ETSI)-defined network architecture concept that enables cloud computing capabilities and an Information Technology (IT) service environment at the edge of the cellular network and, more in general at the edge of any network. The basic idea behind MEC is that by running applications and performing related processing tasks closer to the cellular customer, network congestion is reduced and applications perform better. MEC technology is designed to be implemented at the cellular base stations or other edge nodes, and enables flexible and rapid deployment of new applications and services for customers. Combining elements of information technology and telecommunications networking, MEC also allows cellular operators to open their radio access network (RAN) to authorized third parties, such as application developers and content providers.

C-RAN (Cloud-RAN), also referred to as Centralized-RAN, is an architecture for cellular networks. C-RAN is a centralized, cloud computing-based architecture for radio access networks that supports 2G, 3G, 4G and future wireless communication standards. Its name comes from the four 'C's in the main characteristics of C-RAN system, "Clean, Centralized processing, Collaborative radio, and a real-time Cloud Radio Access Network".

Figure 1B:
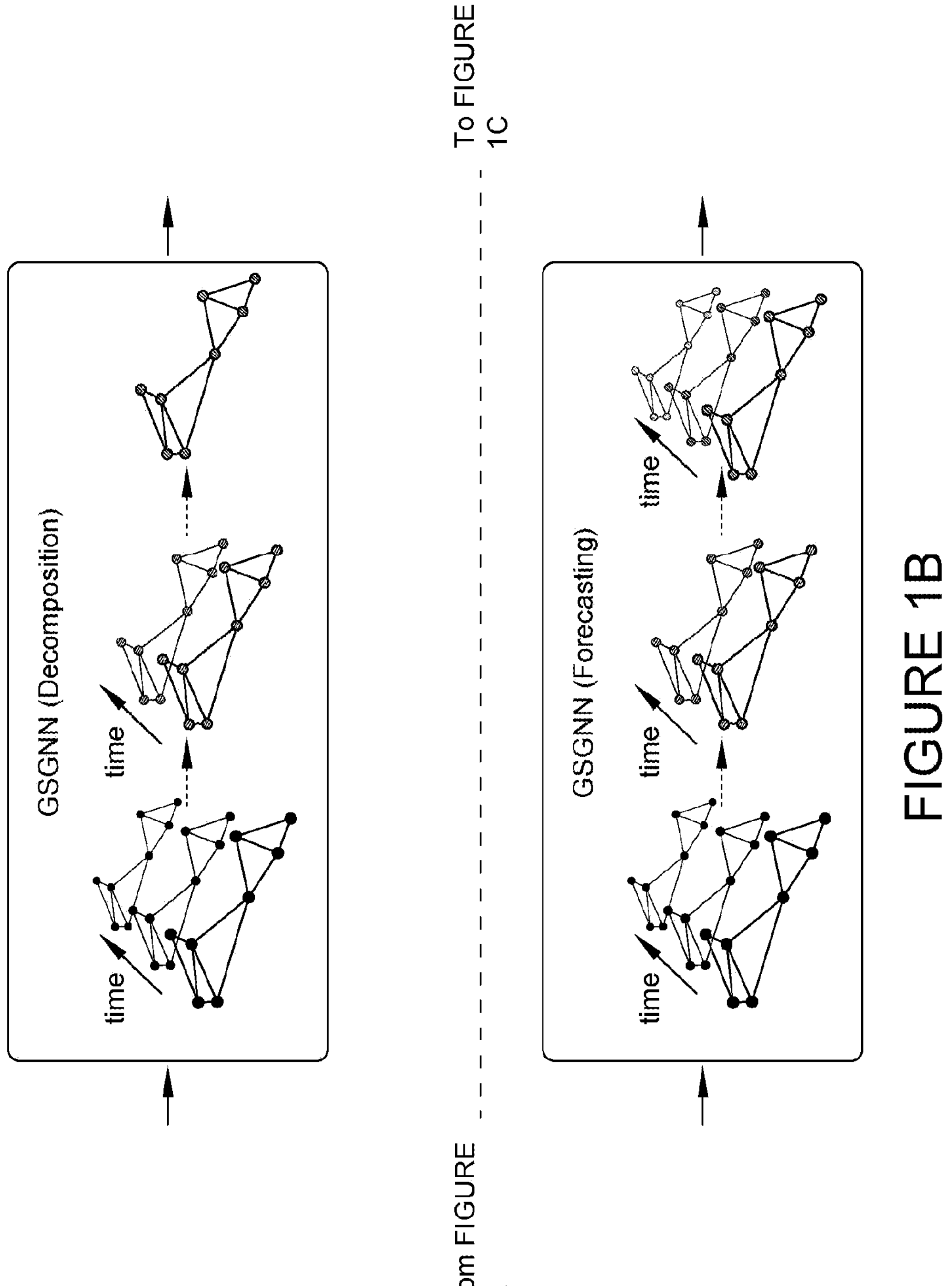
Figure 1C:
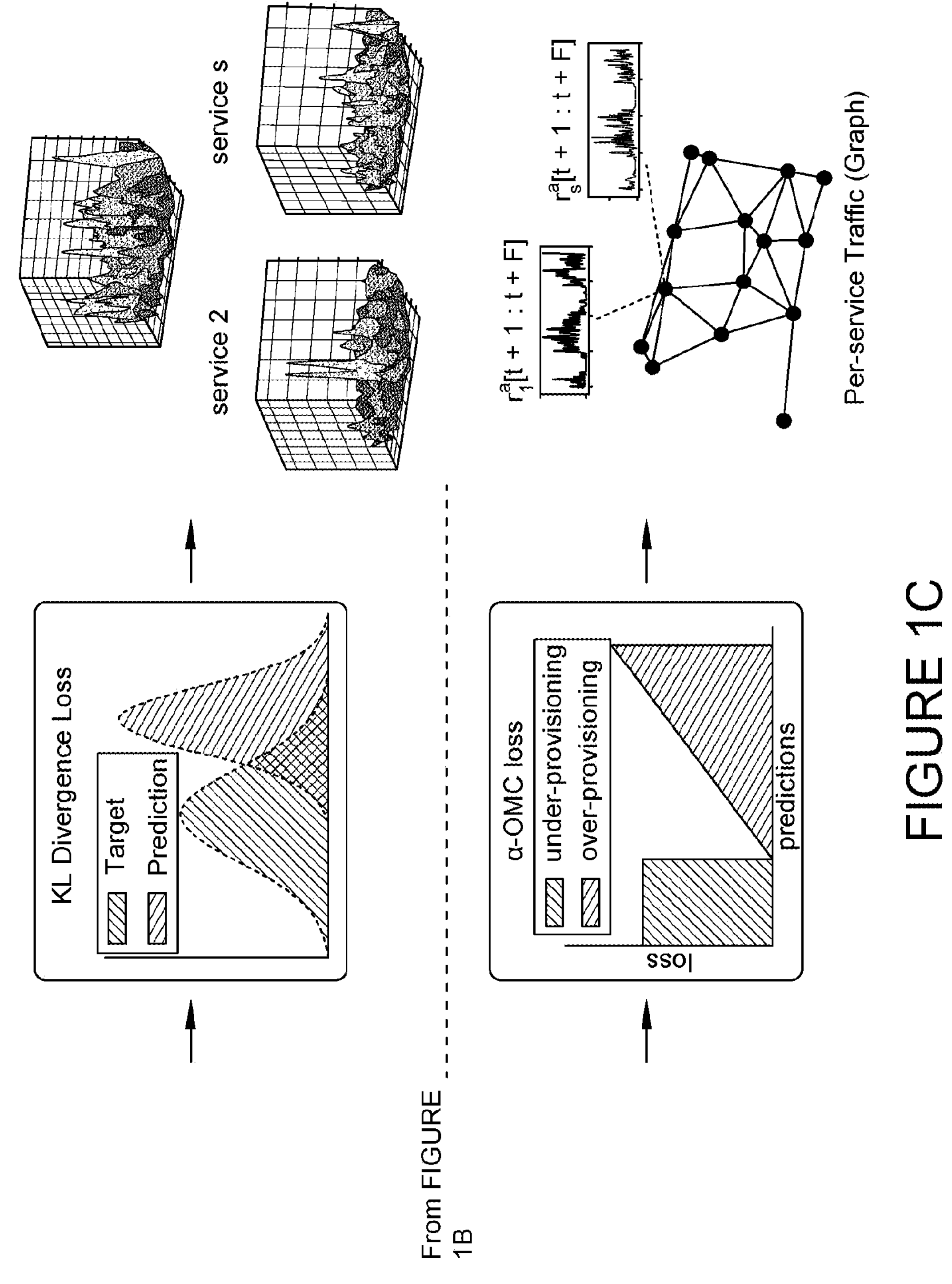

In an example, our method has four main elements: (1) use of a geolocation-preserving representation block, which receives cloud points of antennas as input and converts them into graph representations based on coverage areas, without introducing any spatial distortion; (2) use of a set of lightweight and graphics processing unit (GPU)—friendly Geo-sequential Graph Neural Networks (GSGNN), capable of learning spatial and temporal correlations hidden in complex mobile network traffic; (3) use of a set of methods for neural model fine tuning, which involve normalization and employing Kullback-Leibler (KL) divergence and resource provisioning cost-aware loss functions for model training; (4) use of a method for neural model training that facilitates uncertainty-aware traffic forecasts. An example of an overall architecture is shown in FIGS. 1A, 1B and 1C.

In an example, the mobile network representation block directly constructs a graph structure $\mathcal{G}=(\mathcal{V}, \varepsilon)$ based on the geolocations of antennas, proximal (edge) computing facilities, or datacenters that serve a given mobile network. Each node in the graph represents such a traffic aggregation point, and the connectivity of nodes depends on the adjacency of their coverage areas. In an example, a Voronoi diagram built on these serving locations is adopted to determine the coverage area of each antenna/compute facility, and a graph edge is drawn between two nodes if they share adjacent coverage areas. $Dist(\varepsilon)=\{dist(x, y)|(x, y)\in \varepsilon\}$ denotes the set of the distances of edges in $\mathcal{G}$. In an example, to eliminate weak spatial correlations, any edge is pruned if the Euclidean distance between the nodes it connects is larger than a predefined threshold ($\in$=percentile(x,Dist(ε))). This results in a refined set of edges $\hat{\varepsilon}=\{(x, y) \text{ if } dist(x, y)<\in \sqcup (x, y) \in \varepsilon\}$ and the graph structure $\hat{\mathcal{G}}=(\mathcal{V}, \hat{\varepsilon})$ is used for the target traffic analysis tasks (e.g. decomposition and forecasting).

In an example, to achieve traffic decomposition, the method takes as input a sequence of T−1 past aggregate mobile traffic snapshots as well as the current snapshot $D(t)=\{d_a(t)\|a \in \mathcal{V}\}$ across $|\mathcal{V}|$ antennas/compute facilities of a deployment. It then outputs the fraction of traffic $$d_a^s(t)$$

that belongs to each of the different service at each location at the current time step.

In an example, the method employs Geo-sequential Graph Neural Networks (GSGNN) to extract abstract spatial and temporal correlations from the aggregate mobile traffic. GSGNN includes (e.g. comprises or consists of) two major layers, a temporal gated convolution (TGC) layer and a graph spatial convolution (GSC) layer.

In an example, the temporal gated convolution layer incorporates two 1D $K_t$-width convolution kernels $W1 \in \mathbb{R}^{K_t \times C_i \times C_o}$ and $W2 \in \mathbb{R}^{K_t \times C_i \times C_o}$ that perform convolution operations on the time dimension of the input $\mathcal{X} \in \mathbb{R}^{V \times T \times C_i}$, which are then passed through a non-linear gating unit. In an example, the entire operation can be denoted as $H^1=((W_1 * \mathcal{X}^{T(0,1)}) \odot \sigma(W_2 * \mathcal{X}^{T(0,1)}))_{T(0,1)} \in \mathbb{R}^{(T-Kt+1) \times V \times C_o}$, where σ indicates sigmoid function, ○ indicates Hadamard product, and T(•,•) the transpose function with two given parameters.

In an example, the spatial convolution layer approximates spectral graph convolution via Chebyshev polynomial. If we denote the input as $\mathcal{X} \in \mathbb{R}^{T \times V \times C_i}$, the convolution can be expressed as:

$$H = g_{\theta * \mathcal{G}}\mathcal{X} = g_\theta(L)\mathcal{X} \approx \sum_{k=0}^{K-1} \theta_k T_k(\tilde{L})\mathcal{X},$$

where $T_k(\tilde{L})\mathcal{X}$ is the Chebyshev polynomial of order k evaluated at the scaled Laplacian matrix $\tilde{L}=2L/\lambda max-I_n$ and $\theta_k \in \mathbb{R}^{C_i \times C_o}$ is a learnable parameter. This filter operation is equivalent to gathering information from $K^{th}-1$-order neighbors of the central node.

In an example, one Spatio-Temporal Convolution Block (STCB) is constructed by a TGC layer, a GSC layer followed by a TGC layer. In practice, GSGNN may stack two spatio-temporal convolution blocks to extract the abstract representation of the historical input. Stacking multiple spatio-temporal convolution blocks gives the model wider receptive fields on both space and timing dimensions.

In an example, the output block of the decomposition model takes as input the encoded representation from the spatio-temporal convolution blocks, and passes it through two 1D convolution layers to align the channel size with the number of services to decompose. GSGNN finally outputs the fractions of mobile traffic consumed by each service, relative to the corresponding aggregate, using a softmax function. In an example, GSGNN utilizes layer normalization among blocks to stabilize training.

GSGNN is a lightweight approach for traffic decomposition that entails e.g. 5× fewer trainable parameters compared with best-in-class neural model for traffic decomposition—the Microscope project, with three dimensional (3D)-DefCNN [1], which further involves distorting geospatial preprocessing.

GSGNN is also GPU-friendly during training. In an example, the main operations it performs only involve addition, convolution and matrix multiplication, which allows the model to be trained in mini-batches with maximum GPU usage. This contrasts significantly with the state-of-the-art that adopts 3D deformable convolution layers which perform convolution on irregular portions of the input. Enumerating the indices of such irregular patches is extremely time-consuming for GPUs, leading to low GPU usage (e.g. low efficiency GPU usage) during training.

In an example, neural network training is performed with aggregate traffic measurements and fine grained per-service traffic observations that involve deep packet inspection and classification.

In an example, the method provided trains the decomposition neural networks with the KL-divergence function (omitting the entropy of ground truth distributions which is a constant):

$$KL(t) = \frac{1}{|\mathcal{V}|}\sum_{v\in\mathcal{V}}\sum_{s\in\mathcal{S}} -x_{v,s}^t \log(\tilde{x}_{a,s}^t),$$

where $$x_{a,s}^t$$

indicates the real traffic consumption of service s at antenna a at time step t and $$\tilde{x}_{a,s}^t$$

indicates the predicted value.

In an example, for mobile traffic forecasting, GSGNN is utilized with Monte Carlo Dropout (MC Dropout) to approximate the future traffic-consumption as well as the uncertainty of the predictions. The method adds dropout layers before every weight layer. The dropout layers randomly zero out trainable weights during both training and testing, resulting in different sets of weights applied in different forward passes. This is mathematically equivalent to an approximation to a probabilistic deep Gaussian Process, meaning that sampling T times from the model with MC Dropout applied gives an unbiased estimation of the expectation of predictive values:

$$\mathbb{E}_{q(y^*|x^*)}(y^*) \approx \frac{1}{T}\sum_{t=1}^{T}\hat{y}^*(x^*, W_1^t, \ldots, W_L^t),$$

where $$\{W_1^t, \ldots, W_L^t\}$$

is the set of weights retained in the $t^{th}$ forward pass. The predictive variance is estimated as:

$$\text{Var}_{q(y^*|x^*)}(y^*) \approx \frac{1}{T}\sum_{t=1}^{T}\hat{y}^*(x^*, W_1^t, \ldots, W_L^t)^T\hat{y}^*(x^*, W_1^t, \ldots, W_L^t) - \mathbb{E}_{q(y^*|x^*)}(y^*)^T\mathbb{E}_{q(y^*|x^*)}(y^*)$$

During inference, the mean of the predictions over T forward passes is reported as the forecasting value. Besides, the method also captures the uncertainty of the prediction by generating a band that covers X % of the samples and the band is treated as X % confidence interval.

Figure 3A:
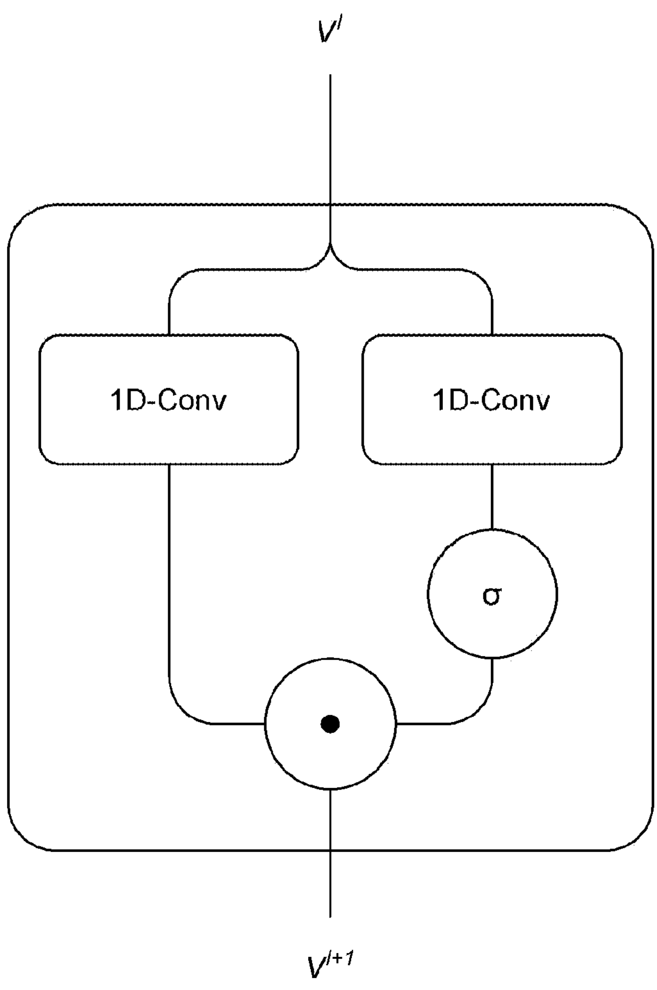
FIG. 3A shows an example structure of a temporal gated convolution layer.
Figure 3B:
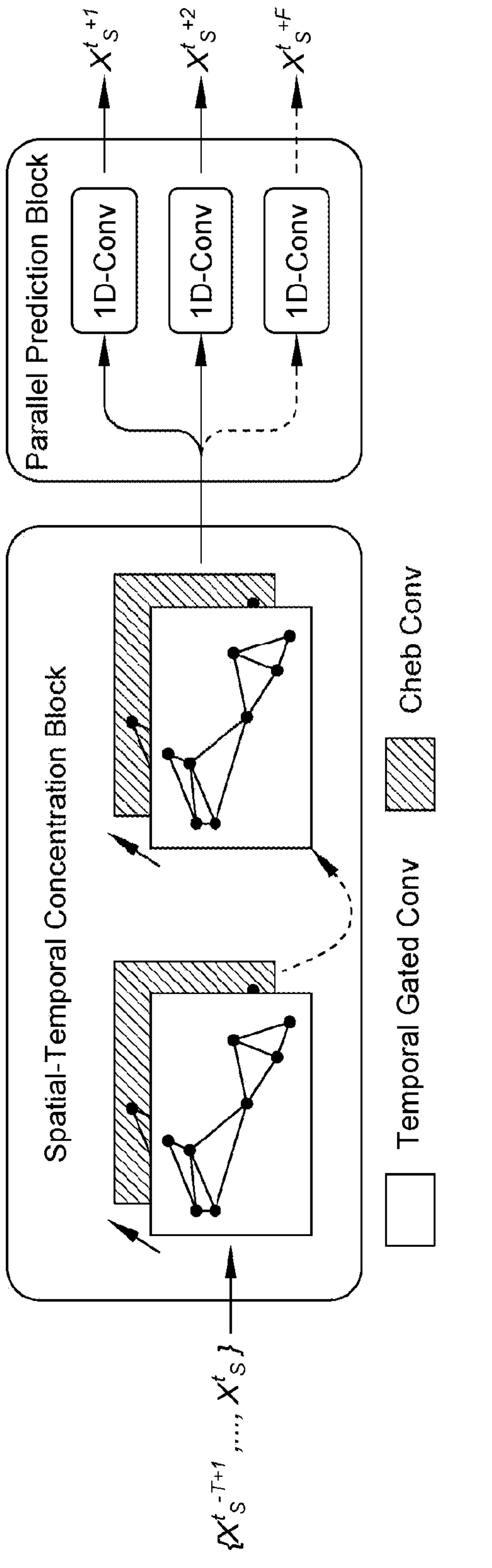
FIG. 3B shows an example architecture of Geo-sequential Graph Neural Networks (GSGNN), which is composed of a Spatio-temporal Concentration Block (STCB) and a Parallel Prediction Block (PPB).

In an example, the method employs the same STCB to encode historical inputs for the forecasting task, but uses several output blocks (e.g as shown in FIG. 3B) to approximate multi-step future traffic consumption in parallel.

In an example, the method trains the forecasting neural networks with an Operator Monetary Cost (α-OMC) function:

$$\alpha\text{-}OMC(\tilde{r}_a^s(t), r_a^s(t)) = \begin{cases} \alpha - \epsilon(\tilde{r}_a^s(t) - r_a^s(t)) & \text{if } \tilde{r}_a^s(t) \le r_a^s(t); \\ \alpha - \frac{1}{\epsilon}(\tilde{r}_a^s(t) - r_a^s(t)) & \text{if } r_a^s(t) < \tilde{r}_a^s(t) \le r_a^s(t) + \epsilon\alpha; \\ \tilde{r}_a^s(t) - r_a^s(t) - \epsilon\alpha & \text{if } \tilde{r}_a^s(t) > r_a^s(t) + \epsilon\alpha, \end{cases}$$

where α is a constant penalty applied when the model under-provisions the demand of service s at antenna/compute facility α. ∈ is a small number that ensures the first and second segments of α-OMC have meaningful gradients.

2 Problem Formulation

Consider a geographic region where the network operator deploys a set of antennas/compute facilities $\mathcal{V}$ which handle traffic generated by a group of services $\mathcal{S}$. Let $$x_{v,s}^t$$

be the traffic generated by service $s \in \mathcal{S}$ accommodated by network entity $v \in \hat{\mathcal{G}}$ at timestep t, and denote $$x_v^t = \sum_{s \in \mathcal{S}} x_{v,s}^t$$

as the aggregate traffic handled by entity v at t. A service snapshot is defined as the traffic volume of all services at all network entities at a given timestep t, e.g., $$\mathcal{X}_{\mathcal{S}}^t = \{x_{v,s}^t | s \in \mathcal{S}, v \in \mathcal{V}\}.$$

Similarly, an aggregate snapshot is defined as the aggregate traffic across all locations at a given timestep, $$\mathcal{X}^t = \{x_v^t | v \in \mathcal{V}\}.$$

We consider two critical spatio-temporal tasks in the mobile networking domain, namely traffic decomposition and traffic forecasting. Traffic decomposition aims to decompose aggregate traffic at the current timestep into per-service traffic consumption, given historical and current aggregate snapshots, which is expressed as:

$$\text{argmax}_{\theta_d} p_{\theta_d}(\mathcal{X}_{\mathcal{S}}^t | \mathcal{X}^{t-T+1}, \ldots, \mathcal{X}^t),$$

where $\theta_d$ is the parameters of the decomposition model. Traffic forecasting takes T previous service snapshots as inputs, and predicts F-step service snapshots in the future. e.g., $$\text{argmax}_{\theta_f} p_{\theta_f}(\mathcal{X}_{\mathcal{S}}^{t+1}, \ldots, \mathcal{X}_{\mathcal{S}}^{t+F} | \mathcal{X}_{\mathcal{S}}^{t-T+1}, \ldots, \mathcal{X}_{\mathcal{S}}^t),$$

where the forecasting model is parameterized by $\theta_f$.

3 Framework Design

As shown in FIGS. 1A, 1B and 1C for example, an example of our framework includes three main elements. The first is a geolocation-preserving representation block, which receives the cloud points of network elements (e.g. antenna locations) as inputs and converts them into a graph representation based on the coverage areas. The preprocessing block sustains relative distances between every pair of antennas so that no spatial distortion is introduced.

The second component is a general graph-based ML neural network, GSGNN, that captures spatial and temporal correlations in data and makes inferences based on specific objectives. To achieve generality for different geo-sequential tasks in mobile networks, our ML architecture is modularized with a Spatio-temporal Concentration Block (STCB) and a Parallel Prediction Block (PPB). The separation of the two blocks ensures that the model has the flexibility to take different shapes of inputs and return different outputs without the need to modify the network architecture.

The third component is a ML network fine tuning method, which employs specialized loss functions (KL divergence, a-OMC function, etc.) associated with different tasks, and uncertainty estimation techniques to approximate the error bounds of the predictions. We detail the geolocation-preserving preprocessing block in Section 3.1, followed by the implementation of the ML architecture in Sections 3.2-3.4. Section 3.5 elaborates how we estimate the uncertainty of the predictions given by the ML model. Section 3.6 introduces a-OMC loss function that we adopt for traffic forecasting.

3.1 Graph Construction

Antennas deployments can be considered as discrete 2-D cloud points in space, without explicit connections among them. Before passing the traffic data to neural networks, we build an undirected weighted graph that connects all the antennas, with weights on edges indicating the distance between each pair of nodes. Using a distance threshold, that is any two nodes are connected if their distance is smaller than a threshold, to determine the adjacency of the nodes (antennas) is the most straightforward approach to construct a graph representation [3]. However, the deployment of antennas often follows the density of the population, i.e., denser antenna placements in city centers and sparser antenna deployment layouts on the city outskirts. Blindly using a distance threshold would make the nodes in the middle of a city fully-connected, whereas network entities on the periphery would only have few edges between them in a graph representation. In practice, two geographically close antennas may not have overlapping coverage and therefore may not be able to serve the same group of users. We thus expect such settings to bear negligible spatial correlations in traffic demand, which motivates us to use coverage areas to establish the logical 'adjacency' of antennas. Specifically, we infer that antennas with adjacent coverage areas may witness similar traffic patterns, i.e., will exhibit stronger spatial correlations, and we construct our graph representations based on this. Let $\mathcal{D}$ be a two dimensional (2D) space with distance function d(•,•), and let $\mathcal{V}$ denote a set of antennas in $\mathcal{D}$. The coverage area of an antenna $v_i \in \mathcal{V}$ is defined as:

$$R_{v_i} = \{x \in \mathcal{D} | d(x, v_i) \le d(x, v_j), \forall j \ne i\},$$

where $R_{v_i}$ is also known as the Voronoi cell of $v_i$. Any point in the Voronoi cell has a closer distance to the antenna in the same cell than to other antennas. Geometrically, one can find the Voronoi cell of a given point $v_i$ with the following steps:

1. Take all the perpendicular bisectors of the segments connecting $v_i$ to the remaining points in $\mathcal{V}$;
2. Delimit half-planes with the perpendicular bisectors;
3. The intersection of all half planes containing $v_i$ is $R_{v_i}$.

Figure 2:
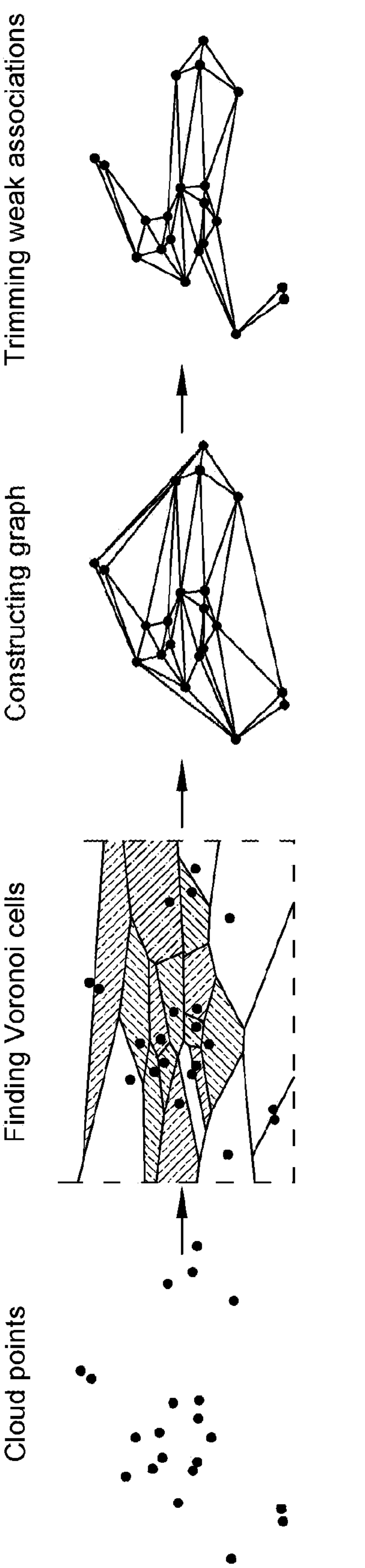
FIG. 2 shows an example of constructing graph representations via a Voronoi Diagram.

Repeating the steps above for all nodes in $\mathcal{V}$ yields the Voronoi diagram of $\mathcal{V}$ as exemplified in FIG. 2.

To construct the deployment graph, we connect every two nodes if their Voronoi cells are adjacent, which gives a set of edges ε:

$$\mathcal{E} = (v_i, v_j), v_i, v_j \in V \,\middle|\, \exists\, x \in \mathcal{X} \text{ s.t. } x \in R_{v_i} \text{ and } x \in R_{v_j}\}.$$

Nevertheless, the outermost Voronoi cells may extend far away from the centre before they become adjacent with others, meaning that the antennas inside the outermost adjacent cells present less significant correlations. In an example, to eliminate such weak connections, we set a threshold ϕ and remove from the graph all edges that are longer than $\phi$ ($\phi$ is configurable parameter that can be set e.g. to 32 km, which is the maximum coverage area of Macrocell base stations [4]). The set of edges remaining is thus:

$$\mathcal{E}_{trim} = \{(v_i, v_j) | d(v_i, v_j) < \phi, \forall (v_i, v_j) \in \mathcal{E}\}.$$

This gives an undirected graph $\mathcal{G}=(\mathcal{V}, \varepsilon_{trim})$. We then assign distance-based weights to edges so that the relative distances between every pair of nodes are kept in G. The weight is computed as follows:

$$w(v_i, v_j) = \begin{cases} e^{-\frac{(d(v_i,v_j))^2}{\sigma^2}} & \text{if } (v_i, v_j) \text{ connected} \\ 0 & \text{otherwise,} \end{cases}$$

in which $\sigma$ is the standard deviation of the lengths of all edges. For simplicity, we use W to denote the weighted adjacency matrix of $\mathcal{G}$.

3.2 Spectral Graph Convolution via Chebyshev Polynomial

A canonical convolution layer can only be applied to regular grid data such as images, but each vertex in the graph has an indeterminate number of neighbors, which makes convolution impossible to be used directly. Instead, we can apply convolutions in the spectral domain via Fourier transforms. Denote $*_{\mathcal{G}}$ as the graph spectral convolution operator. Let $x \in \mathbb{R}^n$ be a graph signal and $g_\theta$ a kernel parametrized by $\theta$. The graph spectral convolution is defined as:

$$g_{\theta *_{\mathcal{G}}} x = g_\theta(L)x = g_\theta(U\Lambda U^T)x = Ug_\theta(\Lambda)U^T x,$$

where $U \in \mathbb{R}^{n\times n}$ is the matrix of eigenvectors of the normalized graph Laplacian $$L = I_n - D^{-\frac{1}{2}} W D^{-\frac{1}{2}} = U\Lambda U^T,$$

and $\Lambda \in \mathbb{R}^{n\times n}$ the diagonal matrix of eigenvalues of L. However, if the parameters in $\theta$ are all independent, the graph convolution is not localized in space. To overcome this issue, we define $g_\theta$ as a polynomial kernel, i.e., $$g_\theta(\Lambda) = \sum_{k=0}^{K-1} \theta_k \Lambda^k,$$

where $\theta$ is a vector of polynomial coefficients. It has been proven that a graph Laplacian L filtered by a $K^{th}$-order polynomial is exactly K-localized [5].

Although it is possible to learn localized kernels through polynomial parametrization, the time complexity of matrix multiplication in $g_\theta(L)x=Ug_\theta(\Lambda)U^Tx$ is still high with $O(n^2)$ operations. ChebNet [3] shows that $g_\theta(L)$ can be approximated by a truncated expansion of Chebyshev polynomial through a recursive computation, which has time complexity of $O(K|\varepsilon|)$:

$$T_{k+1}(x) = 2xT_k(x) - T_{k-1}(x),\ k \in \mathbb{N},$$

where $T_0(x)=1$ and, $T_1(x)=x$. Thus, the graph spectral convolution is further simplified as:

$$g_\theta(\tilde{L})x = \sum_{k=0}^{K-1} \theta_k T_k(\tilde{L})x.$$

In practice, we stabilize training by giving the normalized Laplacian $\tilde{L}=2L/\lambda_{max}-I_n$ ($\lambda$ the maximal eigenvalue of L) to the Chebyshev polynomial, which guarantees that $T_k \in [-1, 1]$, for all $k \in K$. Specifically, the input $\mathcal{X} \in \mathbb{R}^{T\times V\times C_i}$ to our framework incorporates the traffic snapshot over the past T steps. Each snapshot records $C_i$ features for V antennas. The graph convolution of input $\mathcal{X}$ with kernel $\theta \in \mathbb{R}^{K\times C_i\times C_o}$ is expressed as:

$$H = g_\theta *_{\mathcal{G}} \mathcal{X} = g_\theta(L)\mathcal{X} \approx \sum_{k=0}^{K-1} \theta_k T_k(\tilde{L})\mathcal{X} \in \mathbb{R}^{T\times V\times C_o}.$$

3.3 Temporal Gated Convolution (TGC)

We use the temporal gated convolution operation to capture the temporal dynamics on the time axis of graph data. One of the biggest advantages of recurrent neural network (RNN)-based models is that they often employ gating mechanisms as data is forwarded through the network, which allows the models to actively forget less important features but keep task-oriented information. However, due to the time dependency, RNN-based models can only process time-series data sequentially, which would inevitably slow down both training and inference. Instead, we apply one dimensional (1D)-CNN with a gating mechanism [6] when processing the temporal dimension of the graph data, to achieve similar learning effect without sacrificing model efficiency.

As illustrated in FIG. 3A for example, TGC contains two separate 1D-CNN modules. The module applies standard convolution on the time dimension of the input $\mathcal{X} \in \mathbb{R}^{T\times V\times C_i}$ without padding. Denote two kernels in 1D CNN as $W_1, W_2 \in \mathbb{R}^{K_t\times C_i\times C_o}$. The temporal gated convolution is defined as:

$$H^1 = \left(\left(W_1 * \mathcal{X}^{T(0,1)}\right) \odot \sigma\left(W_2 * \mathcal{X}^{T(0,1)}\right)\right)^{T(0,1)} \in \mathbb{R}^{(T-Kt+1)\times V\times C_o},$$

in which $\odot$ represents the Hadamard product and T(•,•) denotes the transpose function with two given dimensions. Each convolution has a $K_t$-width receptive field, and thus can extract information in every $K_t$ neighboring step on the time axis into a single step. However, not all the extracted information would contribute to the downstream task, so we use a separate module $\sigma(W_2 * \mathcal{X}) \in [0,1]$ to control the proportion of the features in $\mathcal{X}$ that should be kept. As data traverses through multiple TGC layers as shown for example in FIG. 3B, we can eventually acquire a hidden representation $H^s \in \mathbb{R}^{1\times V\times C_o}$ of $\mathcal{X}$ that condenses the temporal dynamics into a single step.

3.4 Geo-Sequential Graph Neural Networks

GSGNN is constructed with two submodule types, namely Spatio-temporal Concentration Block (STCB) and Parallel Prediction Block (PPB). In an example, STCB stacks TGC layers and GSC layers alternately, as illustrated for example in FIG. 3B. One pair of TGC and GSC layers reduces the temporal dimension of the input by $K_t$-1 steps and gathers spatial information from neighboring nodes within $K_S$-1 hops. As the neural network becomes deeper, higher-level feature abstraction is acquired, and the STCB eventually concentrates multi-timestep inputs into a single-step hidden representation $$\left(H^l \in \mathbb{R}^{V \times C_o^l}, \text{ where } C_o^l\right.$$

is the output channel size of layer l). This is a universal block for both traffic decomposition and traffic forecasting. The only difference is that the input for traffic forecasting ($\mathcal{X} \in \mathbb{R}^{T \times V \times S}$) has multiple services, whereas for decomposition ($\mathcal{X} \in \mathbb{R}^{T \times V \times 1}$), the volume of traffic is an aggregate across all services.

The Parallel Prediction Block (PPB) is responsible for transforming the hidden representation to multi-step predictions with multiple (e.g. several) independent 1D-CNN layers, each of which generate only one-step predictions. The CNN layers have a kernel size of one, e.g., the number of vertices from $H^l$ remains the same, but the channel size would be aligned with the number of services. Unlike RNN-based neural networks, the number of parallel 1D-CNNs in PPB should be fixed before training and GSGNN cannot produce predictions of arbitrary length. Nevertheless, PPB is actually considerably lightweight, with only $$\left(FC_o^l + 1\right)S$$

parameters. In reality, network operators would not attempt to forecast a large number of service (S) over a long time span (F), given the high variability of network traffic, which ensures that PPB would not be a bottleneck in our design.

3.5 Bayesian Uncertainty Estimation

GSGNN is powerful in terms of extracting spatio-temporal correlations, but it would only output individual prediction values without extra information for mobile operators to assess the reliability of the predictions. It is useful, however, to show to what extent the model is uncertain about the predictions made, especially when the mobile operators may want to schedule extra resources to cope with unforeseen network conditions. Therefore, in an example we tailor Monte Carlo (MC) Dropout into GSGNN to capture uncertainty. Let $\hat{y}$ be the output of a neural network (NN) model with L layers and consider a cost function C(•,•). Denote $W_i$ and $b_i$ as the weights and biases of layer i.

It is common to optimize the model with a regularization term as follows:

$$\mathcal{L}(\hat{y}, y) := \frac{1}{N}\sum_{i=1}^{N} C(y_i, \hat{y}_i) + \lambda \sum_{i=1}^{L}\left(\|W_i\|_2^2 + \|b_i\|_2^2\right) \tag{1}$$

Consider a deep Gaussian Process (GP) with L layers and denote the weights $$\omega = \{Wi\}_{i=1}^{L}\left(W_i \in \mathbb{R}^{K_i \times Ki-1}\right.$$

is a random matrix). The predictive probability of the deep GP model is defined as:

$$p(y \mid x, X, Y) = \int p(y \mid x, \omega) p(\omega \mid X, Y) d\omega. \tag{2}$$

Since the posterior distribution p(ω|X, Y) is intractable, it is common to define a variational distribution q(ω) to approximate the posterior. Define q(ω) as:

$$W_i = M_i \cdot \text{diag}\left([z_{i,j}]_{j=1}^{K_i}\right)$$

$$z_{i,j} \sim \text{Bernoulli}(p_i) \text{ for } i = 1, \ldots, L, \; j = 1, \ldots, K_{i-1},$$

in which $p_i$ is some probability for layer i and $M_i$ the variational parameters. This variational distribution q(ω) is equivalent to having dropout layers before every weight layer in the deep neural networks with dropout probability $\{p_1, \ldots, p_L\}$. Moreover, it was demonstrated that minimizing the KL divergence between q(ω) and p(ω|X, Y) via Monte Carlo approximation can be written as [7]:

$$\mathcal{L}_{GP-MC} \propto \frac{1}{N}\sum_{n=1}^{N} \frac{-\log p(y_n \mid x_n, \hat{\omega}_n)}{\tau} + \sum_{i=1}^{L}\left(\frac{p_i}{2\tau N}\|M_i\|_2^2 + \frac{1}{2\tau N}\|m_i\|_2^2\right), \tag{3}$$

where τ is the model precision. Comparing Equations (1) and (3) reveals that, training a NN model with 1) dropout applied before every weight layer and 2) a L2 regularization term is mathematically equivalent to approximating the probabilistic deep Gaussian Process.

We adopt MC dropout in GSGNN to estimate the confidence of the predictions made. Specifically, we apply dropout during inference and run M times forward passes. The expectation of the predictions can be estimated by:

$$\mathbb{E}_{q(y^*|x^*)}(y^*) \approx \frac{1}{M}\sum_{t=m}^{M} \hat{y}^*(x^*, \omega^t),$$

and the predictive variance is:

$$\text{Var}_{q(y^*|x^*)}(y^*) \approx \frac{1}{M}\sum_{m=1}^{M} \hat{y}^*(x^*, \omega^t)^T \hat{y}^*(x^*, \omega^t) - \mathbb{E}_{q(y^*|x^*)}(y^*)^T \mathbb{E}_{q(y^*|x^*)}(y^*)$$

During inference, the mean of the predictions over T forward passes is reported as the forecasting value, and the bound that covers n % of the samples is treated as the n % confidence interval.

3.6 α-OMC Loss Function

For mobile traffic forecasting, the cost of under-provisioning and over-provisioning are not equal for network operators. Once operators fail to allocate sufficient resources for a specific network service, the users will experience low Quality of Service and this could be a violation of Service Level Agreements (SLAs), resulting in monetary penalties. On the other hand, when network operators provide more capacity to a service than the actual demand, the cost would be proportional to the amount of excess resources allocated.

Since it is impossible to perfectly forecast variations of traffic demand in the future, the best strategy for the operators may be to always slightly overprovision, to avoid the high costs stemming from SLA violations, but not to pay much for any redundant resources.

Our architecture accommodates the needs for traffic forecasting, and therefore the neural networks are trained with a cost-aware loss function, e.g. α-OMC (Operator Monetary Cost) [8], which models the actual monetary cost for network operators. Let $$r_a^s(t)$$

be the actual network demand of service s at antenna a at time t, and $$\tilde{r}_a^s(t)$$

the predicted value of $$r_a^s(t).$$

An example a-OMC function is defined as:

$$\alpha\text{-}OMC(\tilde{r}_a^s(t), r_a^s(t)) = \begin{cases} \alpha - \epsilon(\tilde{r}_a^s(t) - r_a^s(t)) & \text{if } \tilde{r}_a^s(t) \le r_a^s(t) \\ \alpha - \dfrac{1}{\epsilon}(\tilde{r}_a^s(t) - r_a^s(t)) & \text{if } r_a^s(t) < \tilde{r}_a^s(t) \le r_a^s(t) + \epsilon\alpha \\ \tilde{r}_a^s(t) - r_a^s(t) - \epsilon\alpha & \text{if } \tilde{r}_a^s(t) > r_a^s(t) + \epsilon\alpha \end{cases},$$

where α is a customizable penalty denoting the cost of underprovisioning, and ∈ is a small slope that ensures the first two segments of the loss function have meaningful gradients. The optimum of the function is at $$r_a^s(t) + \epsilon\alpha,$$

which satisfies the strategy to always overprovision slightly. Besides, the cost of overprovisioning is smaller than that of underprovisioning when $$\tilde{r}_a^s(t) - r_a^s(t) < \frac{1+\epsilon}{1-\epsilon}\alpha,$$

meaning that there is a higher probability for the model to give predictions higher than optimum instead of lower ones, as an attempt to prevent high penalties due to SLA violation.

4 Evaluations

In an example, we implement Geo-sequential Graph Neural Networks (GSGNN) and the benchmark algorithm 3D Deformable CNN of the Microscope project using Tensorflow 2. (TensorFlow 2 is a library that provides a comprehensive ecosystem of tools for developers, researchers, and organizations who want to build scalable Machine Learning and Deep Learning applications). Both models are trained and optimized on an Amazon Web Services (AWS) p2 instance with 8 NVIDIA Tesla K80 GPUs. The models are optimized via the Adam algorithm [9]. Suitable training data sets may be purchased e.g. from Citi Logik Limited, The Platform, New Station Street, Leeds LS1 4JB, UK. We use an anonymized dataset collected in a large European city containing 729 antennas during 80 days. The dataset consists of 15,360 snapshots, each of which accumulates the volume of 23 mobile services over a 450-second interval. The first two weeks of data is treated as the training set and the rest for evaluation. Apart from antennas, we also consider higher-level network infrastructure including MEC, C-RAN data centers and core network data centers. Following the Microscope project [1], we decide the associations between antennas and higher-level facilities by using a balanced graph k-partitioning algorithm, resulting in 50 MEC facilities, 30 C-RAN data centers and 10 core data centers respectively. Two metrics are used to evaluate the decomposition performance, namely Mean Absolute Error (MAE) and Normalized Mean Absolute Error (NMAE), which are defined as:

$$MAE = \frac{1}{|\mathcal{L}| \cdot |\mathcal{S}| \cdot |\mathcal{V}|} \sum_{l \in \mathcal{L}} \sum_{s \in \mathcal{S}} \sum_{v \in \mathcal{V}} \left| \tilde{x}_{v,s}^l - x_{v,s}^l \right|,$$

$$NMAE = \frac{1}{|\mathcal{S}| \cdot |\mathcal{V}|} \sum_{s \in \mathcal{S}} \sum_{v \in \mathcal{V}} \frac{\sum_{l \in \mathcal{L}} \left| \tilde{x}_{v,s}^l - x_{v,s}^l \right|}{\sum_{l \in \mathcal{L}} x_{v,s}^l},$$

where $\mathcal{L}$ is the length of the evaluation set.

Amazon EC2 P2 Instances are powerful, scalable instances that provide GPU-based parallel compute capabilities. P2 instances, designed for general-purpose GPU compute applications using CUDA and OpenCL, are ideally suited for machine learning, high performance databases, and other server-side workloads requiring massive parallel floating point processing power.

CUDA (or Compute Unified Device Architecture) is a parallel computing platform and application programming interface (API) that allows software to use certain types of graphics processing units (GPUs) for general purpose processing, an approach called general-purpose computing on GPUs (GPGPU). CUDA is a software layer that gives direct access to the GPU's virtual instruction set and parallel computational elements, for the execution of compute kernels.

OpenCL (Open Computing Language) is a framework for writing programs that execute across heterogeneous platforms including central processing units (CPUs), graphics processing units (GPUs), digital signal processors (DSPs), field-programmable gate arrays (FPGAs) or other processors or hardware accelerators.

The experimental results are presented in the Table, which shows decomposition results and the number of parameters in each model. The measurement unit of MAE is Kbps and that of NMAE is %. It can be seen clearly that GSGNN outperforms 3D-DefCNN at all the network levels considered, while employing significantly fewer trainable parameters.

| | antenna | | MEC | | CRAN | | DC | |
|---|---|---|---|---|---|---|---|---|
| Algorithm | MAE | NMAE | MAE | NMAE | MAE | NMAE | MAE | NMAE |
| GSGNN | 0.1602 | 0.0072 | 1.066 | 0.0033 | 1.52 | 0.0028 | 3.40 | 0.0020 |
| Def-CNN3D | 0.1612 | 0.0072 | 1.073 | 0.0033 | 1.69 | 0.0031 | 3.71 | 0.0022 |

| # parameters | antenna | MEC | CRAN | DC |
|---|---|---|---|---|
| GSGNN | 398,951 | 138,215 | 130,535 | 122,855 |
| Def-CNN3D | 1,954,356 | | 403,521 | |

5 Use Cases

A framework, e.g. the NetSibulla framework, targets two main use cases: (1) the automatic allocation of compute and capacity resources in (virtualized) networks; and (2) improving the energy efficiency of communications network infrastructure.

(1) Anticipating the volume of traffic flowing through a network enables the provisioning of the right amount of resources (number of virtual machines/containers, central processing units (CPUs), memory capacity, etc.) where and when they are needed. In turn this helps infrastructure operators reduce capital expenditure, while ensuring sufficient resources are available at any point in time to meet end-user performance requirements (SLA compliance). The forecasts produced by the framework further enable the automation of this resource provisioning (autoscaling), thereby driving engineering-related operation expenditure reduction.

(2) The forecast traffic demands are accurate inputs to a downstream logic that adjusts the capacity in the Radio Access Network (RAN) and enables (public/private) infrastructure owners to optimise energy savings in two ways. First, they can produce optimal periodic (e.g., hourly or daily) RAN configurations that can be enacted at the corresponding time, and which meet the needs of the local user base (e.g., in terms of expected usage of specific classes of mobile services). Second, they can perform live network performance optimisations, with minimal human intervention. These approaches can help reduce the carbon footprint of ever-expanding 5G networks while delivering enhanced capabilities.

Notes re Training

Regarding seeding the neural networks for training, all the neural network parameters can be randomized with standard methods (such as Xavier Initialization). Typically, we find that satisfactory results are obtained with sufficiently small learning rates.

BIBLIOGRAPHY

[1]C. Zhang, M. Fiore, C. Ziemlicki and P. Patras, "Microscope: mobile service traffic decomposition for network slicing as a service," in *Proceedings of the 26th Annual International Conference on Mobile Computing and Networking,* 2020.

[2]C. Zhang, M. Fiore and P. Patras, "Multi-service mobile traffic forecasting via convolutional long short-term memories," in 2019 *IEEE International Symposium on Measurements & Networking* (*M&N*), 2019.

[3]M. Defferrard, X. Bresson and P. Vandergheynst, "Convolutional neural networks on graphs with fast localized spectral filtering," in *Advances in neural information processing systems,* 2016.

[4]"Mobile Phone Base Stations, How do mobile base stations work, Mobile Base Stations in Australia, Cell Tower, Mobile Phone Tower," [Online]. Available: https://mobilenetworkguide.com.au/mobile_base_stations.html.

[5]D. K. Hammond, P. Vandergheynst and R. Gribonval, "Wavelets on graphs via spectral graph theory," *Applied and Computational Harmonic Analysis*, vol. 30, pp. 129-150, 2011.

[6]B. Yu, H. Yin and Z. Zhu, "Spatio-temporal graph convolutional networks: A deep learning framework for traffic forecasting," *arXiv preprint arXiv:*1709.04875, 2017.

[7]Y. Gal and Z. Ghahramani, "Dropout as a bayesian approximation: Representing model uncertainty in deep learning," *International Conference on Machine Learning*, pp. 1050-1059, 2016.

[8] D. Bega, M. Gramaglia, M. Fiore, A. Banchs and X. Costa-Perez, "DeepCog: Cognitive network management in sliced 5G networks with deep learning," in *IEEE International Conference on Computer Communications,* 2019.

[9] D. P. Kingma and J. Ba, "Adam: A method for stochastic optimization," *arXiv preprint arXiv:*1412.6980, 2014.

NOTE

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A distributed mobile network traffic data decomposition and forecasting computer-implemented method including the steps of:

(i) using a geo-location preserving mobile network representation in which locations of mobile network elements are received and converted into a graph representation, in which relative distances between adjacent network elements are preserved using respective weights on graph edges;

(ii) receiving input data comprising aggregate network traffic data from network elements corresponding to the mobile network elements locations, wherein the aggregate network traffic data includes traffic data corresponding to a plurality of services operating over the distributed mobile network;

(iii) using a graph-based neural network based on the geo-location preserving mobile network representation, the graph-based neural network configured to capture spatial and temporal correlations in the input data, the graph-based neural network including at least a spatio-temporal concentration block (STCB) and a parallel prediction block (PPB);

(iv) using loss functions to train the graph-based neural network using the input data, to provide network per-service traffic forecasting, the loss functions including an operator cost function configured to capture operator costs, including under-provisioning costs and/or over-provisioning costs.

2. The method of claim 1, wherein the graph-based neural network includes Geo-sequential Graph Neural Networks (GSGNN).

3. The method of claim 2, wherein the GSGNN include at least the Spatio-temporal Concentration Block (STCB) and the Parallel Prediction Block (PPB).

4. The method of claim 2, wherein the GSGNN includes two or more stacked STCB blocks.

5. The method of claim 2, wherein the GSGNN includes at least two layers: a temporal gated convolution (TGC) layer and a graph spatial convolution (GSC) layer.

6. The method of claim 2, wherein a majority of operations performed by GSGNN during training only involve addition, convolution and matrix multiplication.

7. The method of claim 2, wherein the GSGNN cannot produce predictions of arbitrary length.

8. The method of any previous claim 1, wherein a temporal gated convolution operation is used to capture temporal dynamics on a time axis of graph data.

9. The method of claim 8, including the step of using a one dimensional (1D)-CNN with a gating mechanism, when processing the temporal dimension of the graph data.

10. The method of claim 1, including the step of using predictions of per-service consumption to allocate resources to network slices.

11. The method of claim 10, wherein energy is saved by using optimal periodic (e.g., hourly or daily) RAN configurations that can be enacted at a corresponding time.

12. The method of claim 10, wherein energy is saved by using live network performance optimisations.

13. The method of claim 1, including the step of storing weights of the trained graph-based neural network.

14. The method of claim 1, wherein the geo-location preserving mobile network representation converts the locations into a graph representation based on respective coverage areas.

15. The method of any previous claim 1, wherein in step (i), each node in the graph represents a traffic aggregation point, and a connectivity of nodes depends on an adjacency of their coverage areas.

16. The method of claim 1, wherein a STCB block includes a TGC layer, followed by a GSC layer, followed by a TGC layer.

17. The method of any previous claim 1, wherein in a STCB, each pair of TGC and GSC layers reduces a temporal dimension of the input data and gathers spatial information from neighboring nodes.

18. The method of any previous claim 1, wherein a number of parallel ID-CNNs in PPB is fixed before training.

19. The method of claim 1, wherein the operator cost function is biased to (e.g. always) overprovision.

20. The method of claim 1, wherein a TGC contains two separate 1D-CNN modules.

21. The method of any previous claim 1, including the step of using the trained graph-based neural network to automatically allocate computational and capacity resources in the distributed mobile network.

22. The method of any previous claim 1, including the step of anticipating the volume of traffic flowing through the network to provision an appropriate amount of resources, e.g. number of virtual machines/containers, central processing units (CPUs), memory capacity.

23. The method of any previous claim 1, including the step of using the trained graph-based neural network to improve energy efficiency of infrastructure of the distributed mobile network.

24. The method of any previous claim 1, wherein forecast traffic are inputs to a downstream logic that adjusts capacity in Radio Access Network (RAN) and enables infrastructure owners to optimize energy savings.

25. An apparatus including at least one processor, wherein the at least one processor is configured to (i) use a geo-location preserving mobile network representation in which locations of mobile network elements are received and converted into a graph representation, in which relative distances between adjacent network elements are preserved using respective weights on graph edges;

(ii) receive input data comprising aggregate network traffic data from network elements corresponding to the mobile network elements locations, wherein the aggregate network traffic data includes traffic data corresponding to a plurality of services operating over a distributed mobile network;

(iii) use a graph-based neural network based on the geo-location preserving mobile network representation, the graph-based neural network configured to capture spatial and temporal correlations in the input data, the graph-based neural network including at least a spatio-temporal concentration block (STCB) and a parallel prediction block (PPB);

(iv) use loss functions to train the graph-based neural network using the input data, to provide network per-service traffic forecasting, the loss functions including an operator cost function configured to capture operator costs, including under-provisioning costs and/or over-provisioning costs.

26. A trained apparatus including at least one trained processor, the at least one trained processor's training including (i) using a geo-location preserving mobile network representation in which locations of mobile network elements are received and converted into a graph representation, in which relative distances between adjacent network elements are preserved using respective weights on graph edges;

(ii) receiving input data comprising aggregate network traffic data from network elements corresponding to the mobile network elements locations, wherein the aggregate network traffic data includes traffic data corresponding to a plurality of services operating over a distributed mobile network;

(iii) using a graph-based neural network based on the geo-location preserving mobile network representation, the graph-based neural network configured to capture spatial and temporal correlations in the input data, the graph-based neural network including at least a spatio-temporal concentration block (STCB) and a parallel prediction block (PPB);

(iv) using loss functions to train the graph-based neural network using the input data, to provide network per-service traffic forecasting, the loss functions including an operator cost function configured to capture operator costs, including under-provisioning costs and/or over-provisioning costs, wherein the at least one trained processor is configured to perform a distributed mobile network traffic data decomposition and forecasting method.

* * * * *